US012229788B1

(12) United States Patent  
Gupta et al.

(10) Patent No.: US 12,229,788 B1  
(45) Date of Patent: Feb. 18, 2025

(54) SYSTEM AND METHOD FOR PERFORMING PRODUCT ANALYTICS FOR MACHINE LEARNING PLATFORMS

(71) Applicant: American Express Travel Related Services Company, Inc., New York, NY (US)

(72) Inventors: Himanshu Gupta, Chhattisgarh (IN); Gourav Kumar Sharma, Uttar Pradesh (IN); Krishnaprasad Narayanan, Karnataka (IN); Rahul Ghosh, Karnataka (IN)

(73) Assignee: American Express Travel Related Services Company, Inc., New York, NY (US)

( * ) Notice: Subject to any disclaimer, the term of this patent is extended or adjusted under 35 U.S.C. 154(b) by 132 days.

(21) Appl. No.: 17/516,126

(22) Filed: Nov. 1, 2021

(51) Int. Cl.
   *G06Q 30/02* (2023.01)
   *G06F 16/23* (2019.01)
   *G06Q 30/0201* (2023.01)

(52) U.S. Cl.
   CPC ..... *G06Q 30/0201* (2013.01); *G06F 16/2379* (2019.01)

(58) Field of Classification Search
   CPC .. G06Q 30/02; G06Q 30/0201; G06Q 10/063; G06Q 10/0639; G06Q 10/06395; G06Q 10/06393
   See application file for complete search history.

(56) References Cited

U.S. PATENT DOCUMENTS

| 11,042,579 | B2 | 6/2021 | Wegryn et al. | |
|---|---|---|---|---|
| 2002/0026589 | A1* | 2/2002 | Fukasawa | G06F 11/3476 714/E11.204 |
| 2010/0083046 | A1* | 4/2010 | Tanaka | G06F 11/079 714/E11.029 |
| 2018/0329993 | A1 | 11/2018 | Bedadala et al. | |
| 2019/0339843 | A1* | 11/2019 | Yost | G06F 3/04817 |
| 2022/0027977 | A1* | 1/2022 | Ring | G06Q 30/0631 |
| 2022/0092668 | A1* | 3/2022 | Lu | G06N 5/04 |

OTHER PUBLICATIONS

Pimentel, J. F., Leonardo, M., Vanessa, B., & Freire, J. (2021). Understanding and improving the quality and reproducibility of jupyter notebooks. Empirical Software Engineering, 26(4). (Year: 2021).*

* cited by examiner

*Primary Examiner* — William S Brockington, III  
(74) *Attorney, Agent, or Firm* — Sterne, Kessler, Goldstein, & Fox, P.L.L.C.

(57) ABSTRACT

A system and method for generating product analytics insights for machine learning platforms is disclosed. The system and method can receive a log file including data derived while executing a software program. Software packages and the package sub-modules logged in the log file may be categorized into a plurality of package categories. A notebook in which the software code is written, and identified in the log file, may be categorized into a notebook category. A consumable insight may be generated based on: the categorized software packages and package sub-modules, and the categorized notebook. A natural language summary may be generated describing the consumable insight. The natural language summary may be transmitted for display on a graphical user interface (GUI) in response to a user query.

20 Claims, 11 Drawing Sheets

| Input (Queries) | Modules used | | | | Sample Output |
|---|---|---|---|---|---|
| | Rollup module | Basic Module | Primary Module | Derived Module | |
| What is the % increase of machine learning package users in the last quarter? | No | Yes | Yes | No | There was 11.32% growth recorded for users who used machine learning packages in the last quarter (Q1, 2021) |
| How many users from CFR business unit used the platform last month? | Yes | Yes | No | Yes | There were 334 CFR colleagues who used the platform last month (June 2021) |
| Number of users of the platform in Quarter 2, 2021? | No | Yes | No | No | There were 1945 platform users recorded in Q2, 2021 |

Product Analytics Dashboard

Q Give me the list of director with potential machine learning use case  × — 904

○ String Search   ○ Semantic Search

| BUSINESS UNIT | STATUS | Start Date | End Date |
|---|---|---|---|
| None Selected ∨ | None Selected ∨ | 04/02/2021 | 04/30/2021 |

○ User-wise Group   ○ BU-wise Group   ● Director-wise Group

| DIRECTOR NAME | COLLEGUE COUNT | ML NOTEBOOKS COUNT | TOTAL NOTEBOOK COUNT | TOTAL TIME SPENT SECONDS | TIME SPENT PER EMPLOYEE (HOURS) | ML LIBRARIES USED | COMMENT |
|---|---|---|---|---|---|---|---|
| > Name 1 | 12 | 196 | 809 | 1810934 | 13.52 | xgboost | 📄 |
| > Name 2 | 12 | 141 | 234 | 5337058 | 3.99 | keras,sklearn | 📄 |
| > Name 3 | 8 | 131 | 428 | 8196579 | 9.18 | spacy,nltk,textblob... | 📄 |
| > Name 4 | 4 | 121 | 230 | 4752019 | 10.65 | keras,sklearn, gensim... | 📄 |
| > Name 5 | 1 | 92 | 127 | 28994098 | 25.98 | fbprophet,sklearn,stats... | 📄 |
| > Name 6 | 3 | 91 | 149 | 2994098 | 8.94 | sklearn,nltk,pytess... | 📄 |
| > Name 7 | 12 | 62 | 133 | 2733539 | 2.04 | xgboost,nltk,sklearn... | 📄 |
| > Name 8 | 3 | 58 | 97 | 1233979 | 3.69 | sklearn,xgboost,tensor... | 📄 |
| > Name 9 | 7 | 57 | 122 | 2484066 | 3.18 | xgboost,sgboost,sklearn... | 📄 |

FIG. 11

SYSTEM AND METHOD FOR PERFORMING PRODUCT ANALYTICS FOR MACHINE LEARNING PLATFORMS

TECHNICAL FIELD

Aspects relate to systems for performing product analytics.

BACKGROUND

Gaining insights into who uses a product and how a product is used is important for a product manager, who is in charge of planning roadmaps for and marketing the product. The insights gained can help the product manager understand which features are commonly used and by whom. This understanding can further enable the product manager to focus on improving commonly used features, and tailoring product roadmaps with particular users and/or business units in mind. The insights can also help highlight features that are not commonly used, and allow the product manager to make decisions whether to phase those features out or to focus on improving those features to gain wider adoption.

Product managers responsible for software products, and particularly those that are responsible for products that use machine learning models developed using machine learning platforms such as Jupyter™ developed by Project Jupyter, currently lack the ability to obtain meaningful insights about user activities related to usage of their software products. For example, if the product has a feature that performs data extraction, product managers are unable to discern a number of users who have performed a data extraction job over a period of time. Additionally, product managers are unable to track which users use their product. For example, if a product manager wants to know the number of users who are building a deep learning model for using a TensorFlow they are unable to do so because conventional systems do not provide the ability and tools to obtain these insights. Thus, systems and methods are needed to address these issues.

SUMMARY

Aspects of this disclosure are directed to a system and methods for generating product analytics insights. The system and methods allow users of the system to gain further insights into who is using a software and/or a platform on which the software is being developed, and how the software and/or the platform is being used. The system and methods provide several improvements over conventional systems. These improvements include: (1) allowing users of the system to gain insights regarding user activities related to usage of software packages/services used in a software product; (2) allowing users of the system to gain insights regarding user activities related to a platform on which a software is being built; (3) allowing for categorization of software packages/services of a software program to enable generating insights; (4) generating natural language summaries of the insights generated; and (5) providing a graphical user interface (GUI) that users of the system can use to obtain the insights, by for example, providing capabilities to do natural language queries/searches for particular insights and providing natural language answers to those queries.

Some aspects are directed to systems and methods that receive a log file including data derived while executing a software program on a platform. The software program may be stored in a notebook of the platform. The data can include information about what software packages and package sub-modules (i.e., code, libraries of code, classes, methods, functions, etc.) the software program utilizes, and user information regarding authors and users of the software program. The system can categorize the software packages and the package sub-modules into a plurality of package categories, and categorize the notebook into a notebook category based on the categorized software packages and package sub-modules. A consumable insight may be generated based on: the categorized software packages and package sub-modules, and the categorized notebook, where the consumable insight specifies a metric quantifying usage of the software program. The system can generate, in a natural language, a summary describing the consumable insight. The system can select a prepared insight question from a plurality of prepared insight questions such that the summary provides an answer, in the natural language, to the selected prepared insight question. The system can further store the matched summary and prepared insight question pair in a database. The summary may be transmitted for display on a graphical user interface (GUI) in response to a query received when the query matches the prepared insight question.

In aspects, the consumable insight may be a first consumable insight. The system can generate a second consumable insight based on the user information. A second summary of the second consumable insight may be generated. A second prepared insight question from the plurality of prepared insight questions may be selected such that the second summary provides a second answer, in the natural language, to the selected second prepared insight question. The system can store the matched second summary and the second prepared insight question pair in the database. The second summary may be transmitted for display on the GUI in response to a second query received when the second query matches the second prepared insight question.

In aspects, the first consumable insight and the second consumable insight may be combined into a third consumable insight. A third summary of the third consumable insight may be generated. The system can select a third prepared insight question from the plurality of prepared insight questions such that the third summary provides a third answer, in the natural language, to the selected third prepared insight question. The system can store the matched third summary and the third prepared insight question pair in the database. The third summary may be transmitted for display on the GUI in response to a third query received when the third query matches the third prepared insight question.

In aspects, the system can pre-process the log file to extract data or remove unwanted data. The system can generate a user profile based on the user information in the log file.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the art to make and use the aspects.

FIG. 4 shows an example of how a mapping of an input query to an output of the system is performed according to aspects.

FIG. 9 shows an example graphical user interface (GUI) of the system showing a product analytics dashboard and a user-wise display according to aspects.

FIG. 11 shows an example GUI of the system showing a product analytics dashboard and a director-wise display according to aspects.

In the drawings, like reference numbers generally indicate identical or similar elements. Additionally, generally, the left-most digit(s) of a reference number identifies the drawing in which the reference number first appears.

DETAILED DESCRIPTION

Figure 1:
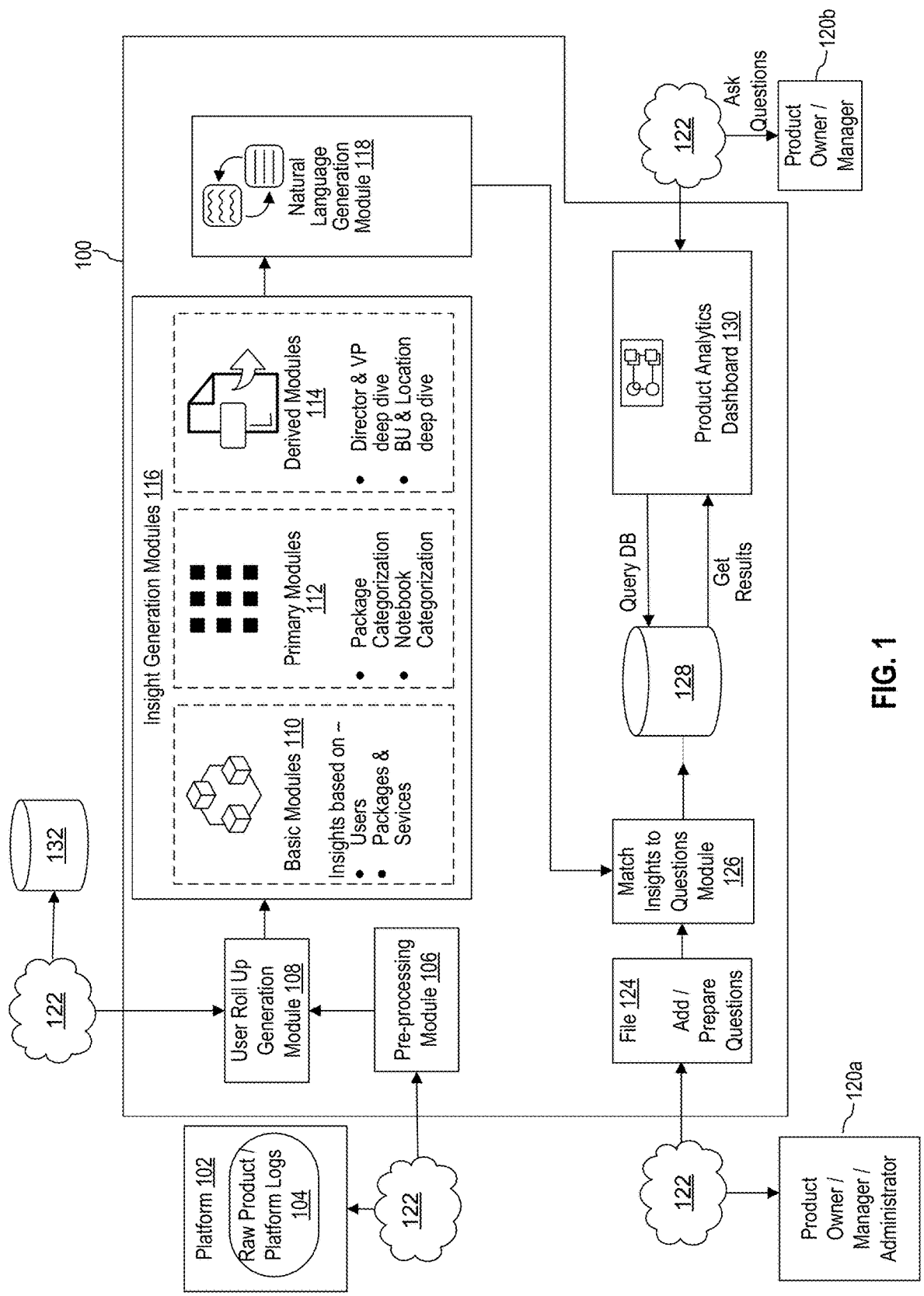
FIG. 1 is an example system for generating product analytics insights according to aspects.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Certain aspects have other steps or elements in addition to or in place of those mentioned. The steps or elements will become apparent to those skilled in the art from a reading of the following detailed description when taken with reference to the accompanying drawings.

System Overview and Function

FIG. 1 is an example system 100 for generating product analytics insights according to aspects. Product analytics insights (also referred to as consumable insights or a consumable insight in this disclosure) refer to quantitative measures (also referred to as metrics or a metric in this disclosure) that relate to a software and/or the platform on which the software is built. The product analytics insights/consumable insights may be presented to users of the system 100 in both a natural language format or as a standalone value. As used in this disclosure, quantitative measures/metrics do not refer strictly to numerical values, but refer generally to values or entities that may be measured, categorized, identified, and/or quantified. For example, the quantitative measures/metrics can include categories of software, the identity of individuals, and the identity of business units, in addition to numerical values that may be derived from the categories, individuals, or business units.

In aspects, the consumable insights may be generated by the system 100 by identifying individual users that are using the software, identifying individual users who are using the platform to develop the software, identifying business units of those individual users, identifying software packages and package sub-modules and/or services that are used to build the software, identifying categories that those software packages and package sub-modules and/or services belong to, etc. Based on the aforementioned identified metrics, statistics or numerical values may be determined. For example, these metrics can indicate a number of users using a particular software, a number of users using particular packages and/or services of the software, a number of users in a business unit using the software, how many users are using the software over a period of time, etc. In this way, a variety of quantitative measures/metrics may be identified, and consumable insights may be generated based on the same.

In aspects, the system 100 can individually provide the consumable insights generated to users of the system 100, or can combine multiple consumable insights generated to users in response to complex search queries users can input into the system 100. Users of the system 100 may be, for example product managers responsible for a software product, which the system 100 provides consumable insights for. Additional users can include another manager or administrator tasked to manage day-to-day aspects related to the software product.

In aspects, consumable insights transmitted to users by the system 100 may be mapped to search queries provided by users. The system 100 can match the search queries to the consumable insights based on known and prepared insight questions, which the system 100 is given in advance. The consumable insights may be matched to the prepared insight questions in advance, and when a search query is given to the system 100, the system 100 can match the search query to the closest equivalent prepared insight question. The system 100 can then provide the consumable insights to users in response to the query. For example, a user can query the system 100 with questions such as "what is the % increase of users using machine learning software packages in the last quarter?" or "how many users from the CFR business unit used the software platform last month?" and the system 100 can provide consumable insights in response to the questions, which the system 100 has predetermined.

In aspects, the system 100 can generate natural language summaries summarizing the consumable insights it generates. The consumable insights may be displayed to users via a graphical user interface (GUI). This may be done by, for example, generating natural language summaries describing the consumable insights and having the system 100 transmit the natural language summaries for display on a GUI, to be presented to users in response to search queries. In this way, the system 100 can enable presentation of answers to questions in a much more user-friendly manner than conventional systems, by providing answers to queries using natural language that incorporate the consumable insights generated. By way of example, in response to the query "what is the % increase of users using machine learning software packages in the last quarter?" the system 100 can generate a natural language summary for the consumable insight indicating there was an 11.32% increase to be "there was 11.32% growth recorded for users who used machine learning software packages in the last quarter (Q1, 2021)." Additionally, in response to the query "how many users from the CFR business unit used the software platform last month?" the system 100 can generate a natural language summary for the consumable insight indicating there were, for example, 334 CFR business unit users to be "there were 334 CFR colleagues who used the software platform last month (June 2021)." How the system 100 generates the natural language summaries for the consumable insights will be discussed further below. It should be noted that while the system 100 is capable of presenting natural language summaries for the consumable insights, the system 100 also has the capability to provide values for the consumable insights in a non-natural language format, or can present the consumable insights in other formats such as charts, graphs, etc., to be presented to users. In this way, the system 100 can output consumable insights in a variety of ways.

In aspects, the system 100 may be implemented on a server. The server may be a variety of centralized or decentralized computing devices. For example, the server may be a mobile device, a laptop computer, a desktop computer, grid-computing resources, a virtualized computing resource, cloud computing resources, peer-to-peer distributed computing devices, a server farm, or a combination thereof. The server may be centralized in a single room, distributed across different rooms, distributed across different geographic locations, or embedded within a network 122. The server can couple with the network 122 to communicate with other devices, such as a client device 120. With respect to FIG. 1, two client devices are shown as 120*a* and 120*b*. This is exemplary. More or less client devices may be used with the system 100. The client device 120 may be used by a product manager, an administrator, or other manager of the product to query the system 100 or may be used to provide the prepared insight questions to the system 100, which can then be matched to consumable insights. While the server can couple with the network 122 to communicate with other devices, the server can also be a stand-alone device.

The client device 120 may be any of a variety of devices, such as a smart phone, a cellular phone, a personal digital assistant, a tablet computer, a notebook computer, a laptop computer, a desktop computer, or a combination thereof. The client device 120 can couple, either directly or indirectly, to the network 122 to communicate with the server or may be a stand-alone device.

The network 122 refers to a telecommunications network, such as a wired or wireless network. The network 122 can span and represent a variety of networks and network topologies. For example, the network 122 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 122. Cable, Ethernet, digital subscriber line (DSL), fiber optic lines, fiber to the home (FTTH), and plain old telephone service (POTS) are examples of wired communication that may be included in the network 122. Further, the network 122 can traverse a number of topologies and distances. For example, the network 122 can include a direct connection, personal area network (PAN), local area network (LAN), metropolitan area network (MAN), wide area network (WAN), or a combination thereof.

For illustrative purposes, in the aspect of FIG. 1, the system 100 and client devices 120*a* and 120*b* are shown as endpoints of the network 122. This, however, is exemplary and it is understood that there may be different partitions between the client devices 120*a* and 120*b*, the server on which the system 100 is implemented, and the network 122. For example, the client devices 120*a* and 120*b*, and the server on which the system 100 is implemented can also function as part of the network 122.

In aspects, the system 100 can include modules to perform some or all of its functionality. The modules can include, a pre-processing module 106, a user roll up generation module 108, insight generation modules 116, a natural language generation module 118, and a match insights to question module 126. The modules and how they facilitate the interactions between the system 100 and external devices such as the client devices 120*a* and 120*b* will be discussed further below.

In aspects, the system 100, in addition to coupling with a client device 120, can also couple and interact with further external devices. These further external devices can include a platform 102 and a user profile database 132. The platform 102 refers to a program or a software development environment on which software and/or machine learning models, which may be incorporated into a software, may be developed. An example of a platform 102 is Jupyter™ developed by Project Jupyter. Other similar platforms may be coupled to the system 100.

The user profile database 132 refers to a database or repository that stores user information. In aspects, the user profile database 132 may be, for example, an employee database of a company or institution. The user information may be information about users of the software. The user information can comprise employment related information about employees, business units, the management structure of the business units, etc., of a company or institution that uses the software. How the system 100 integrates with the platform 102 and the user profile database 132 to generate consumable insights will be discussed further below.

With respect to the process by which the system 100 generates the consumable insights, in aspects and as shown in FIG. 1, the system 100 first obtains a log file 104 from the platform 102. The log file 104 refers to a computer file that is generated by the platform 102. The log file 104 can take the form of a JavaScript Object Notation (JSON) file, a text file, or similar text based file types. The log file 104 can contain information and data derived and/or generated while executing a software program on the platform 102. The information contained in the log file 104 can include information about what software packages and package submodules and/or services the software utilizes, in addition to user information regarding users of the software program. This information may be obtained while a software is executed and recorded in the log file 104 by the platform 102. For example, the software may be stored on the platform 102 or within a workspace/notebook of the platform 102, and may be executed from within the platform 102 and/or the workspace/notebook. When the software is executed, the platform 102 can record, in the log file 104, the names of the various packages and package sub-modules and/or services (i.e., the software code, classes, methods, etc.) that are invoked while executing the software. Further, what may be logged in the log file 104 is metadata including information about the time the software was executed, by whom the software was executed, from what devices the software was executed, from what location the software was executed, etc.

The workspace/notebook refers to an application or sub-module of the platform 104 that allows a developer of the software to create and share documents that contain live code, equations, visualizations and narrative text. In the example where the platform 102 is Jupyter™, the workspace/notebook may be the Jupyter Notebook. In aspects, information regarding the workspace/notebook can also be recorded in the log file 104, for example, the name of the workspace/notebook, etc. For the purposes of discussion with respect to system 100, it is assumed that a log file 104 is generated by the platform 102 and may be received by the system 100.

In aspects, once the log file 104 is received by the system 100, control and the log file 104 may be passed to the pre-processing module 106. The pre-processing module 106 can process the log file 104 to put the log file 104 in a format that further modules of the system 100 can parse and obtain information from. The log file 104 can have a copy made and the copy comprise the processed log file 104 which the pre-processing module 106 can generate. The pre-processing module 106 can process the log file 104 to extract relevant data from the log file 104 and/or remove irrelevant and/or unwanted data from the log file 104, so that what remains in the log file 104 and/or a copy of the log file 104 is data from which the consumable insights may be generated. The extraction of data and/or removal of irrelevant and/or unwanted data can include extracting or removing certain entries or fields of data that were logged, and formatting the log file 104 so that only a subset of data that was originally in the log file 104 remains. The data remaining can include, for example, the names of software packages and package sub-modules and/or services invoked when executing the software, names of users executing the software, execution times, any device identifiers indicating from which device the software was executed, etc. What data is determined to be extracted or removed may be customized by a designer of the system 100, and may be modified to fit the needs of product managers, administrators, or managers based on what consumable insights they would like to receive.

In aspects, once the pre-processing module 106 has processed the log file 104, control and the processed log file 104 may be passed to the user roll up generation module 108. The user roll up generation module 108 can enable generation of user profiles based on user information in the processed log file 104. The user roll up generation module 108 can generate the user profiles by parsing the processed log file 104 to determine the names of individuals/users listed in the log file 104. These individuals/users may be, for example, users that have executed the software. Once the names of the individuals/users are obtained from the log file 104, the user roll up generation module 108 can compare those individuals/users to names of known persons, which may be, for example, employees, contractors, etc. of a company or institution, that are stored in the user profile database 132 to verify the individuals/users' identities and to further obtain other relevant information about the individuals/users. The user roll up generation module 108 can perform the comparison by comparing the names found in the log file 104 to names stored in the user profile database 132. In this way, individuals may be identified, and further information regarding the individuals may be obtained to generate the user profiles. This further information can include what business unit these individuals belong to, what their titles are, who their managers are, who their direct reports are, any projects they are working on, and any other employee related information typically stored by a company in an employee database or otherwise. From this information, user profiles may be generated for each individual/user that has executed the software. The user profiles may be data structures containing the user names and accompanying identifying information and/or user organizational information obtained from the user profile database 132. By generating the user profiles, the system 100 can obtain an understanding of who and what type of individuals are using the software.

In aspects, the user profiles can also be linked to or have as part of their information, which software packages and package sub-modules and/or services were invoked by the users when executing the software. In this way, specific software packages or package sub-modules and/or services may be connected to users executing the software so that consumable insights may be generated indicating what users invoked what software packages and package sub-modules and/or services.

In aspects, once the user roll up generation module 108 generates the user profiles, control, the user profiles, and the processed log file 104 may be passed to the insight generation modules 116. The insight generation modules 116 refer to a set of modules of the system 100 that can enable generation of the consumable insights. The insight generation modules 116 can generate the consumable insights by deriving and/or generating metrics from the information in the processed log file 104 and the user profiles, which may be used to form the consumable insights. The insight generation modules 116 may be bucketed and/or categorized into three categories (or types) of modules. These types can include basic modules 110, primary modules 112, and derived modules 114.

In aspects, the basic modules 110 category refers to a subset of the insight generation modules 116 that can derive or generate consumable insights based on basic mathematical functions. The basic modules 110 may be software programs that perform these mathematical functions. These basic mathematical functions include functions that can do numerical counting such as computing sums, computing sums over a period of time, computing percentages, etc. to generate metrics related to user usage of the software program, package and package sub-modules and/or service utilization, etc. For example, the basic modules 110 can implement computer code or logic that can determine based on the processed log file 104 and the user profiles, how many users used a software program, how many users invoked particular packages and package sub-modules and/or services, etc. In this way, statistics may be generated regarding users usage of the software and about the usage of specific packages and package sub-modules and/or services of the software.

In aspects, the primary modules 112 category refers to a subset of the insight generation modules 116 that may be software modules that derive consumable insights based on categorizations of the packages and package sub-modules and/or services invoked by the software. The primary modules 112 can also derive or generate consumable insights based on categorizations of workspaces/notebooks of the platform 104 that contain and/or call on the packages and package sub-modules and/or services. The identified packages and package sub-modules and/or services, or identified notebooks may be those identified in the processed log file 104.

In aspects, the primary modules 112 can perform a categorization of those packages and package sub-modules and/or services, and perform a categorization of the notebooks, and based on the categorizations derive metrics related to the categorizations to determine what category of software is being used by users of the software. For example, categories for the packages and package sub-modules and/or services may be predetermined. The various packages and package sub-modules and/or services may be bucketed into categories indicating the packages belong to a particular class of software. For example, these categories may be machine learning code, analytics code, or general-purpose code. The machine learning category refers to code used to perform or build some type of machine learning task. The analytics category refers to code used to perform some type of analytics (i.e., some type of computation or specialized computing function for the software). The general-purpose category refers to code used to perform general function such as search functions, delete functions, or similarly general-purpose operations performed commonly in a software program.

In aspects, consumable insights generated by the primary modules 112 can indicate, for example, what the categories of software the packages and package sub-modules and/or services belong to. In this way, a software program may be classified as a particular type based on determined categorizations for the packages and package sub-modules and/or services from which the software is assembled. This is useful for large and complex software applications that have multiple functions. This is also useful when determining what functions of those complex software applications are used more often or if certain functions are used at all.

In aspects, the primary modules 112 can also aggregate the categorizations of the various packages and package sub-modules and/or services for each notebook identified in the processed log file 104, and can determine an overall notebook categorization for notebooks identified. The notebook categorizations can indicate whether the notebooks contain software code that can, in the aggregate, be categorized as being related to a machine learning category, an analytics category, a general purpose category, or no code category. The no code category for the notebooks can refer to a catchall category where the computer code implemented in a notebook is not actually code that performs a function or computation, but rather encompasses code that provides definitions for functions, classes, methods, or comprises values such as static variables, constants, links, etc. that other functions, classes, or methods use. In this way, workspaces/notebooks can also be categorized to indicate what overall functions the software performs and how and by whom the functions are used. How the primary modules 112 perform the categorizations to determine the package categories and notebook categories will be discussed further below. For the purposes of discussion with respect to FIG. 1, it is assumed that the categorization is performed.

In aspects, the derived modules 114 category refers to a subset of the insight generation modules 116 that can derive or generate consumable insights based on the user profiles. For example, the derived modules 114 can generate metrics based on what business units are using what software packages and package sub-modules and/or services via the users that are executing the software. The consumable insights derived or generated by the derived modules 114 can indicate what particular business unit's users belong to, from what locations these business units operate, from what location the users operate, etc. and tie this information back to particular packages and package sub-modules and/or services. In this way, particular business units may be mapped to, or connected to, software packages and package sub-modules and/or services so that consumable insights may be obtained regarding which business units are using particular aspects of the software.

In aspects, the consumable insights derived or generated by the insight generation modules 116 may be based on known and past considerations of the product needs and previous experiences regarding information needed by product managers, administrators, or managers that manage a software product. In this way, logic may be implemented to compute certain metrics that form the basis of the consumable insights, based on information typically used by product managers, administrators, or managers of the software product, and may be implemented based on input provided by these various stakeholders and/or users of the system 100. As the needs of the users of the system 100 change, the logic and/or rules based on which the consumable insights are generated may be modified to generate different types of consumable insights so that the system 100 can adapt to evolving user needs.

In aspects, once the insight generation modules 116 derive and/or generate the consumable insights, the consumable insights may be stored in a database or repository for later retrieval and processing by further components of the system 100. One of the further components may be the natural language generation module 118. The natural language generation module 118 can enable the generation of a natural language summary describing the consumable insights. This may be done by having the natural language generation module 118 implement natural language generation (NLG) algorithms and techniques to generate a natural language summary for the consumable insights. The NLG algorithms can include template-based systems that take the consumable insights generated and plug them into form templates. The form templates may be sample sentences, which are answers to common queries, or questions that the product managers, administrators, or managers ask. Examples of common questions may be "what is the % increase of the number of users for the software in the last quarter?", "how many users from a particular business group used the software last month?", etc. In response to these questions, templates may be generated and populated with the consumable insights to generate the natural language summaries.

In other aspects, the NLG algorithms can include training statistical models typically on a large corpus of human-written texts, and using machine learning to determine typical question answer pairs to generate natural language summaries for the consumable insights. Machine learning models, such as Markov Chains, Recurrent Neural Networks (RNN), Long short-term memory (LSTM), transformers, or similar models, may be used and trained to respond to certain queries. Based on the training, the natural language generation module 118 can learn typical language structure and responses and populate the same with the consumable insights to form the natural language summaries for the consumable insights. The trained system 100 recognizes the intent, entities, and context of a user input question in natural language, which can further be utilized to generate insights. For example, based on the query "how many users from business unit X used the software in April this year," the trained system 100 first captures the entities as "business unit X" as the business unit, "April 2021" as time-period and "calculating number of users" being an intent. A person of ordinary skill in the art (POSA) will recognize how to use the aforementioned techniques to generate text summaries for the consumable insights. For the purposes of this disclosure, it is assumed that natural language summaries may be generated.

In aspects, once the natural language generation module 118 generates the natural language summaries for the consumable insights, control may be passed to the match insights to question module 126. The match insights to question module 126 can enable mapping the natural language summaries and consumable insights to prepared insight questions from a plurality of prepared insight questions such that the summaries can provide answers, in a natural language, to the selected prepared insight questions. The prepared insight questions refer to sample questions provided to the system 100 in advance by product managers, administrators, or managers of the software product that are typically ask by them and reflecting what consumable insights they would like to obtain. The prepared insight questions may be provided to the system 100 to train the system 100 to map individual prepared insight questions to the natural language summaries. In this way, the system 100 may be trained to match consumable insights to typical questions asked by users of the system 100 so that when users query the system 100 the consumable insights and/or the natural language summaries containing the consumable insights may be quickly transmitted to users as the answer to their query.

In aspects, the prepared insight questions may be provided to the system 100 via a file 124. The file 124 may be any type of computer text file containing the prepared insight questions. The file 124, in addition to the natural language summaries, may be given as inputs to the match insights to questions module 126 via a client device 120, and the match insights to questions module 126 can implement natural language processing algorithms or techniques to match the natural language summaries to selected prepared insight questions. In this way, a natural language summary and selected prepared insight question pair may be obtained. Similar machine learning models and techniques as those described with respect to the natural language generation module 118, for example such as Markov Chains, RNNs, LSTMs, transformers, or similar models, may be trained to match prepared insight questions to natural language summaries. A POSA will recognize how to use the aforementioned techniques to train the system 100 to match the natural language summaries to the prepared insight questions given this disclosure. For the purposes of this disclosure, it is assumed that the system 100 may be trained such that a matching may be performed.

In aspects, once a matched summary and prepared insight question pair is obtained, the matched pair may be stored in a database 128. The stored natural language summary and prepared insight question pair may be used when generating responses to user queries received by the system 100. For example, the pair may be used when users of the system 100 input queries asking specific questions for which they would like to obtain consumable insights for. As shown in FIG. 1, the queries may be input via a client device 120 and into a product analytics dashboard 130. The product analytics dashboard 130 refers to a GUI interface from which users of the system 100 can interact with the system 100. The product analytics dashboard 130 will be discussed further below. For the purposes of discussion with respect to FIG. 1, it is assumed that users can query the system 100 via the product analytics dashboard 130.

In aspects, once the query is received by the product analytics dashboard 130, the product analytics dashboard 130 can attempt to match the query to a stored natural language summary and prepared insight question pair. The system 100 performs a fuzzy matching between the query and the insight question answer pair stored in the database. Based on the closest match the output summary gets generated. For example, the product analytics dashboard 130 can query the database 128 to try to match the query to prepared insight questions stored in the database 128. The matching may be done by finding an exact match or by using natural language processing techniques and probability to match the query to the closest equivalent prepared insight question. Based on finding a match, the database 128 can transmit and/or the product analytics dashboard 130 can retrieve from the database 128, the natural language summary paired with the matched prepared insight question and display the same to the user in response to the query.

In aspects, if a match to the query is not found the database 128 and/or the product analytics dashboard 130 can provide the user a message indicating that no consumable insights exist for that query and/or can give a template message to the same effect. The query not found can further be fed back into the system 100 and may be stored as a potential prepared insight question, which a consumable insight should be generated for. In this way, the system 100 can continuously learn and determine what consumable insights and queries users of the system 100 need, and can provide feedback to administrators or designers of the system 100 regarding what types of data should be extracted from the log file 104, and/or what types of logic needs to be implemented to obtain the consumable insights in response to the queries.

Figure 2:
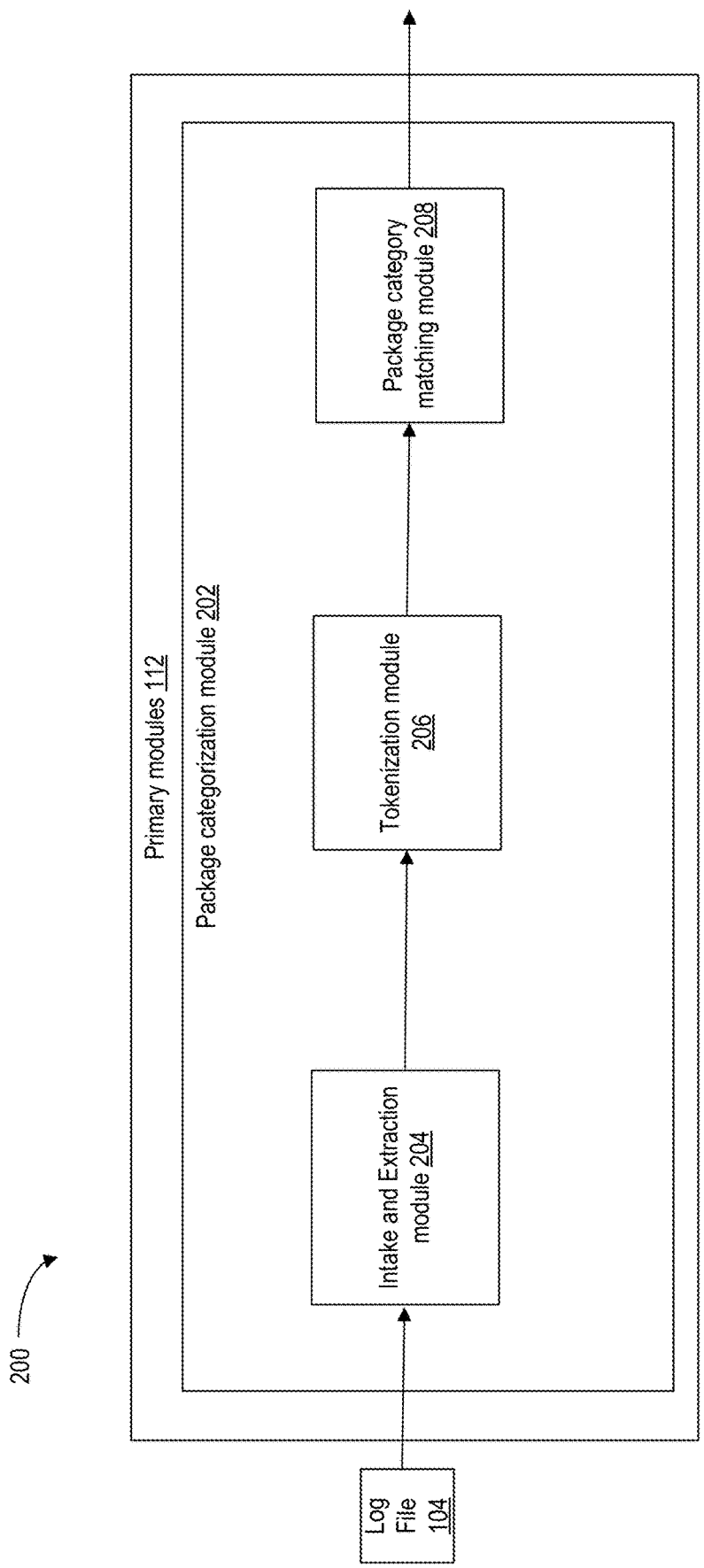
FIG. 2 is an example control flow for how software package categorization is performed by the system according to aspects.

FIG. 2 is an example control flow 200 for how software package categorization is performed by the system 100 according to aspects. The software package categorization refers to the process by which the primary modules 112 classify the packages and package sub-modules and/or services of the software. The software package categorization may be performed by a package categorization module 202, which can enable categorizing of the packages and package sub-modules and/or services as described with respect to FIG. 1. The package categorization module 202 can contain further sub-modules to enable the categorization. In aspects, these can include an intake and extraction module 204, a tokenization module 206, and a package category matching module 208.

To perform the software package categorization, in aspects, the processed log file 104 may be received by the intake and extraction module 204. Once the intake and extraction module 204 receives the processed log file 104, it can identify packages and package sub-modules and/or services names from the processed log file 104 and perform a series of retrieval and text extraction functions to enable classification of the packages and package sub-modules and/or services. For example, once a package or package sub-module and/or service name is identified, the intake and extraction module 204 can query a repository with information regarding known packages or package sub-modules and/or services along with their descriptions, to determine more information about the identified package or package sub-module and/or service. The repository can have descriptions regarding what the package or package sub-module and/or service does, what the functions are, any user notes regarding the functionality of the package or package-submodule and/or service, etc. The intake and extraction module 204 can extract text from the various descriptions to determine what functionality the package or package sub-module and/or service performs. The aforementioned extraction assumes that the intake and extraction module 204 has been trained to recognize features and/or keywords as being relevant to an understanding of what functions the package or package sub-module and/or service performs. For the purposes of discussion with respect to FIG. 2, it is assumed that such a training has taken place such that such an extraction can take place.

In aspects, once the intake and extraction module 204 performs its text extraction functions, control and the extracted text may be passed to the tokenization module 206. The tokenization module 206 can generate tokens from the keywords or text extracted by the intake and extraction module 204. The tokens refer to values representing keywords or text. The tokens may be a sequence of real values that represent and map to each of the keywords or text extracted. The purpose of performing a tokenization is to more easily perform natural language processing tasks on the keywords or text so that a computer can determine a context or meaning of those keywords or text. A POSA will be familiar with the tokenization process.

In aspects, once the tokenization module 206 generates the tokens, control and the tokens may be passed to the package category matching module 208. The package category matching module 208 can enable matching and/or classifying the packages or package sub-modules and/or services to the package categories described with respect to FIG. 1, based on processing the tokens. This may be done by having the package category matching module 208 implement natural language processing algorithms or techniques that can perform the matching and/or classifying. The natural language processing algorithms or techniques can perform functions to determine the context of each of the tokens. This may be done by implementing algorithms or techniques, using transformers, RNN, or LSTM models that can look at the surrounding tokens of each tokenized keyword to determine the context of each token in an N-dimensional space. For example, the context may be determined based on using transformer based models such as the Bidirectional Encoder Representations from Transformers (BERT) model developed by Google™ or the Robustly optimized BERT (RoBERTa) model developed by Facebook™. A POSA will be familiar with such models to determine context of keywords that have been tokenized. For the purposes of discussion with respect to FIG. 2, it is assumed that the context may be determined based on the aforementioned models.

In aspects, once the context is determined, the package category matching module 208 can perform a matching based on the determined context of the overall package or package sub-module and/or service based on its description. Again, this assumes that the package category matching module 208 has been trained to perform a matching to certain pre-defined package categories. By way of example, the category matching module 208 may be trained to look for a re-occurrence or frequently used keywords which may be associated with a particular category. For example, if the keywords "ARTIFICIAL INTELLIGENCE" or "MACHINE LEARNING" occur or re-occur more than a threshold value of times in the textual description of the package or package sub-module and/or service, the package category matching module 208 may be trained to categorize that package or package sub-module and/or service to a machine learning category. Similarly, the package category matching module 208 may be trained to perform categorization of code into the general purpose category or analytics category.

In aspects, once the package category matching module 208 performs its matching and categorization functions, the output of the package categorization module 202 can be a data structure indicating the package or package sub-module and/or service and its categorization. The package categorization can then be used by the primary modules 112 and/or other insight generation modules 116 to generate consumable insights.

Figure 3:
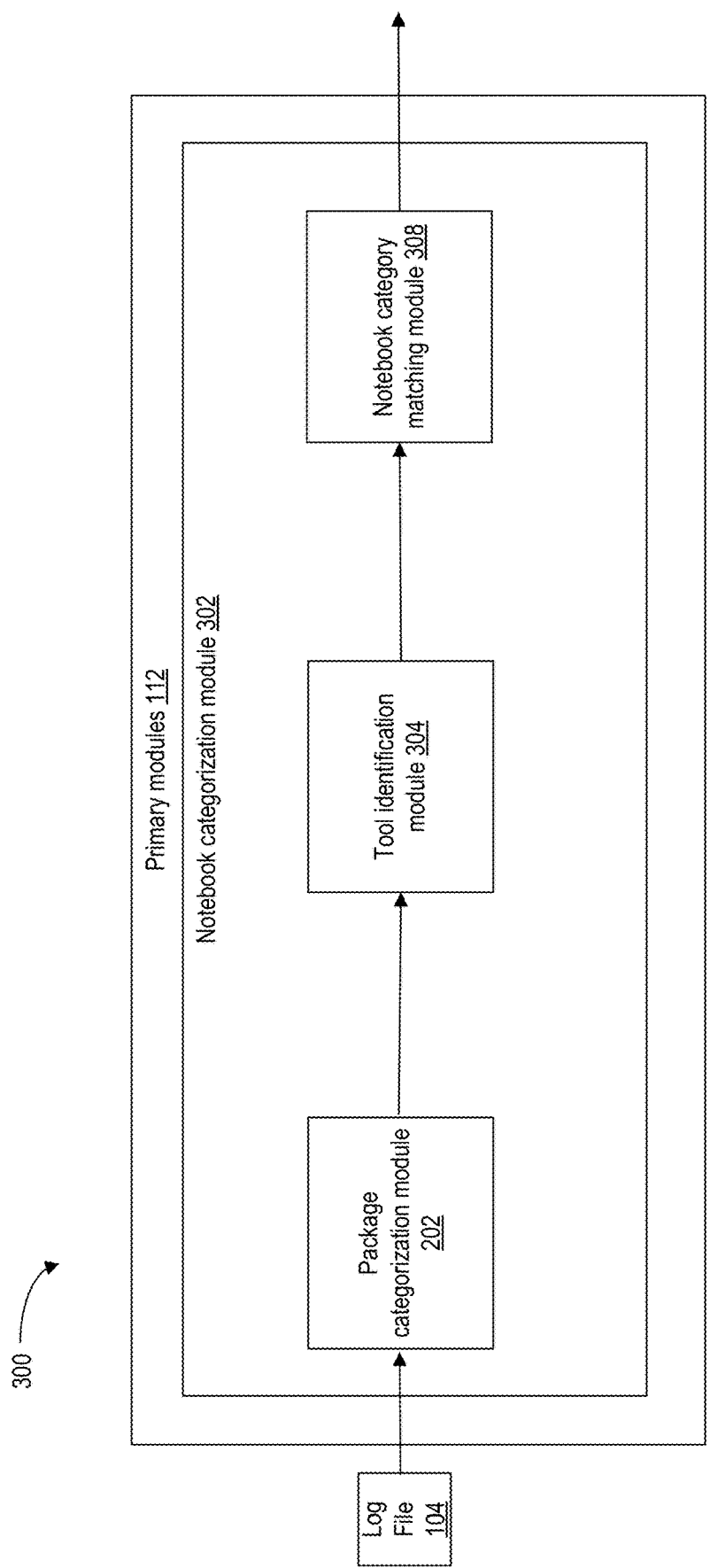
FIG. 3 is an example control flow for how notebook categorization is performed by the system according to aspects.

FIG. 3 is an example control flow 300 for how notebook categorization is performed by the system 100 according to aspects. The notebook categorization refers to the process by which the primary modules 112 classify the notebooks/workbooks of the platform 102 identified in the processed log file 104. In aspects, the notebook categorization may be performed by a notebook categorization module 302, which can enable categorizing of the notebooks/workbooks as described with respect to FIG. 1. The notebook categorization module 302 can contain further sub-modules to enable the categorization. These can include the package categorization module 202, a tool identification module 304, and a notebook category matching module 308.

To perform the notebook categorization, in aspects, the notebook categorization module 302 can incorporate the package categorization module 202 and utilize the package categorizations along with other categorizations the notebook categorization module 302 can generate, to obtain the notebook categorizations. For example, an implementation for the notebook categorization module 302 can have the package categorization 202 performed for all the packages and package sub-modules and/or services in a notebook/workbook identified from the processed log file 104. Once this categorization is performed for all the packages or package sub-modules and/or services in aggregate for a notebook/workbook, and all the packages and package sub-modules and/or services are categorized, control can pass to the tool identification module 304.

In aspects, the tool identification module 304 can enable identification and categorization of any tools used by the software that are integrated with the notebook/workspace. Tools refer to any services either built into the platform 102 or integrated with the platform 102 that are called by the software via APIs or otherwise to facilitate functioning of the software. Examples of tools are Apache Spark™, which is an open source unified analytics engine for large-scale data processing, or libraries of code associated with certain programming languages, or functions that originate from third-party sources but can integrate into the software, such as pandas, which is a software library written for the Python programming language for data manipulation and analysis, or Scikit-learn™, which is another machine learning library for the Python programming language, etc. The aforementioned are examples of tools that may be used, but are not meant to be limiting.

In aspects, the tool identification module 304 may be trained to identify tools and perform a categorization of these tools. This may be done in much the same way the package category matching module 208 may be trained to categorize that package or package sub-module and/or service to a package category. For example, this may be done by training the tool identification module 304 to map certain known tools to certain pre-determined categories, such as machine learning tools, general purpose tools, analytics tools, etc. The tools themselves, much like the packages and package sub-modules and/or services can have text or descriptions indicating what functions those tools perform. The tool identification module 304 can use that textual description and parse, extract, and analyze those descriptions in much the same way that the text for packages and package sub-modules and/or services was extracted and analyzed by the package category matching module 208, to categorize the tools. For example, similar natural language processing algorithms and techniques described with respect to the package category matching module 208 may be implemented for the tool identification module 304 to extract certain keywords and determine the context of those keywords. Based on determining the context, the tool identification module 304 can determine what functions the tool performs to categorize the tool accordingly. In this way, the tool identification module 304 can categorize various tools used by the software.

In aspects, once the tool identification module 304 performs its function and any tools used by the software are identified and categorized, control may be passed to the notebook category matching module 308. The notebook category matching module 308 can analyze the package categories determined and the tool categories determined, and determine an overall categorization for the notebook/workspace. This may be done based on determining which package categories and/or tool categories occur most for a given notebook. For example, this may be done by determining a percentage of occurrence for each of the categories, and based on the percentage determine that the notebook/workspace has more of a certain category type of packages and package sub-modules and/or service or tools. Based on the same the notebooks/workspaces may be categorized as that particular type. For example, if a percentage above a threshold value of the tools and/or packages and package sub-modules and/or services are categorized in a particular category, for example machine learning, analytics, general purpose, or no category, the notebook/workspace may be determined to be of that particular category. In this way, entire notebooks/workspaces may be categorized and consumable insights may be generated based on the categorizations.

FIG. 4 shows an example of how a mapping of an input query to an output of the system 100 is performed according to aspects. FIG. 4, shows the relationship of the various modules of the system 100 and how they are involved in generating the consumable insights for input queries. For example, three sample input queries are shown in FIGS. 4 as 402*a*, 402*b*, and 402*c* corresponding to three sample outputs shown as 404*a*, 404*b*, and 404*c*. In aspects, each of the input queries can utilize multiple modules and consumable insights generated by those modules to generate each of the outputs. In this way, the various consumable insights generated by the different modules of the system 100 (e.g., the user roll up generation module 108, the basic modules 110, the primary modules 112, and the derived modules 114) may be combined to provide output summaries. By way of example, a user can input a query 402*a* asking the system 100, "What is the % increase of machine learning package users in the last quarter?" Because this query requires the system 100 to compute a basic mathematical value (i.e., the percentage increase) and further requires the system 100 to determine the percent increase for a particular category of packages (i.e., the machine learning category), the consumable insights generated by both the basic modules 110 and the primary modules 112 may be combined to generate output 404*a* which can indicate, for example, that "there was 11.32% growth recorded for users who used machine learning packages in the last quarter (Q1, 2021)."

As another example, input query 402*b* can ask, "How many users from CFR business unit used the platform last month?" Because this query requires the system 100 to compute a basic mathematical value (i.e., the number of users), requires the system 100 to determine users for a particular business unit (i.e., the CFR business unit) using the user information that may be obtained from the user profiles, the consumable insights generated by both the basic modules 110, the derived modules 112, and the user roll up generation module 108 may be combined to generate output 404*b* which can indicate, for example, that "there were 334 CFR colleagues who used the platform last month (June 2021)." Thus, in this way, various input queries and outputs may be generated by combining consumable insights generated by the various insight generation modules 116.

The modules described in FIGS. 1-4 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It has been discovered that the system 100 described above improves the state of the art from conventional systems because it allows users of the system 100 to gain insights regarding user activities related to usage of software packages/services used in a software product which they cannot do with conventional systems. For example, conventional systems do not allow specific insights about user activities related to usage on a software package and package sub-modules and/or services level. Thus, by being able to analyze the specific software packages and package sub-modules and/or services invoked, tying those to users and business units, and generating consumable insights based on the same, the system 100 significantly improves the ability of users to gain insights, at a much more granular level, as to how a specific piece of software is being used.

The system 100 described further improves conventional systems by implementing a novel way to categorize packages and package sub-modules and/or services and notebooks to enable generation of consumable insights. The system 100 does this by utilizing natural language processing algorithms and techniques to learn the context of the packages and package sub-modules and/or services (from the various texts describing the same) which conventional systems do not do. The system 100 further improves conventional systems by generating natural language summaries of the insights generated. These natural language summaries can summarize the consumable insights in a way that is more user friendly than output presented by conventional systems because they provide narrative outputs that may be easily read and consumed by users of the system 100 in a question-answer conversation format. Conventional systems do not have this functionality.

Methods of Operation

Figure 5:
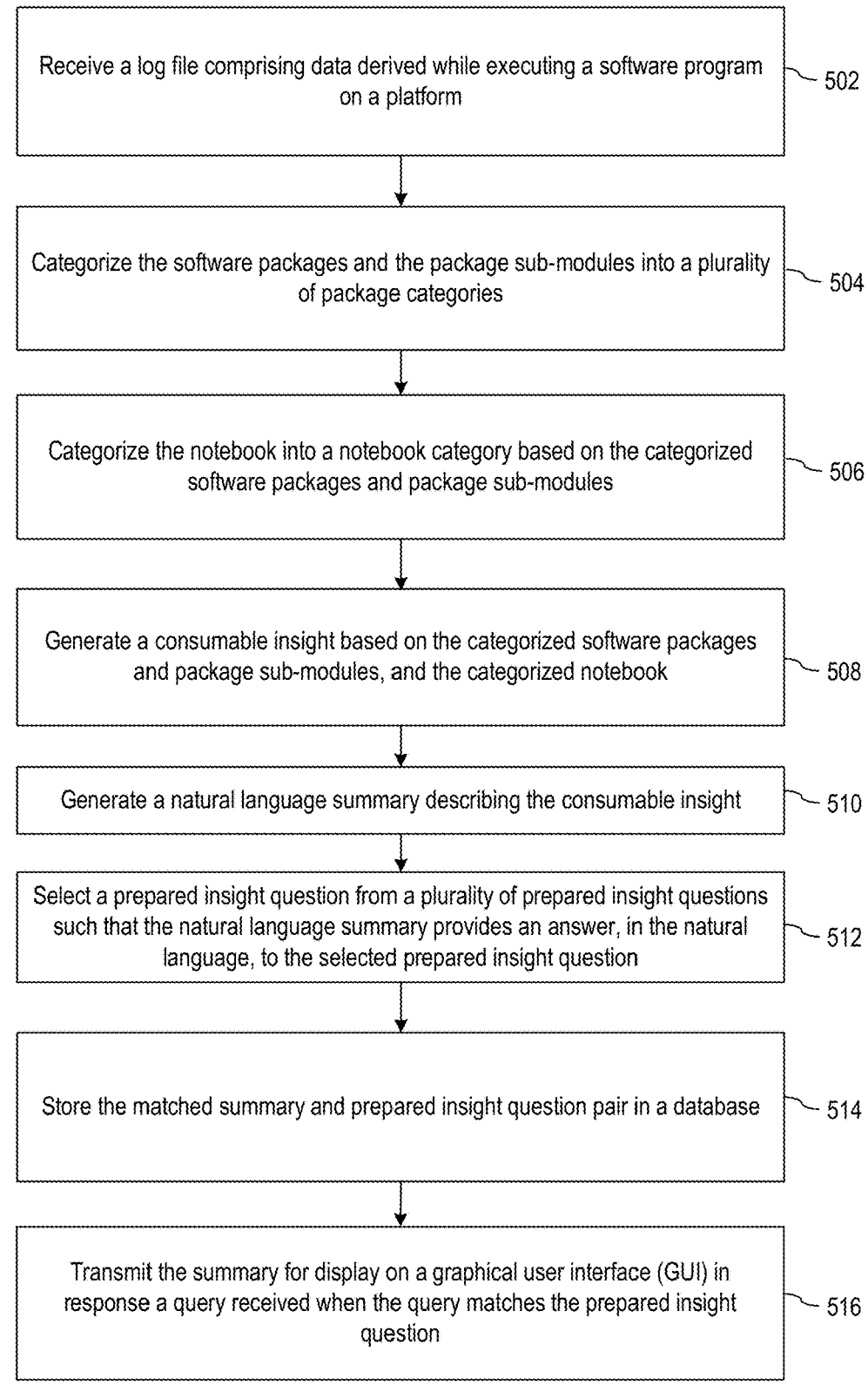
FIG. 5 is an example method of operating the system to generate a consumable insight according to aspects.

FIG. 5 is an example method 500 of operating the system 100 to generate a consumable insight according to aspects. Method 500 may be performed as a series of steps. At step 502, method 500 can include receiving a log file 104 comprising data derived while executing a software program on a platform 102. At step 504, software packages and the package sub-modules logged in the log file 104 may be categorized into a plurality of package categories. At step 506, a notebook in which the software code is written, and which is identified in the log file 104 may be categorized into a notebook category based on the categorized software packages and package sub-modules. At step 508, a consumable insight may be generated based on: the categorized software packages and package sub-modules, and the categorized notebook. At step 510, a natural language summary may be generated describing the consumable insight. At step 512, a prepared insight question may be selected from a plurality of prepared insight questions such that the natural language summary provides an answer to the selected prepared insight question. At step 514, the matched summary and prepared insight question pair may be stored in a database 128. At step 516, the natural language summary may be transmitted for display on a GUI in response to a query received when the query matches the prepared insight question.

Figure 6:
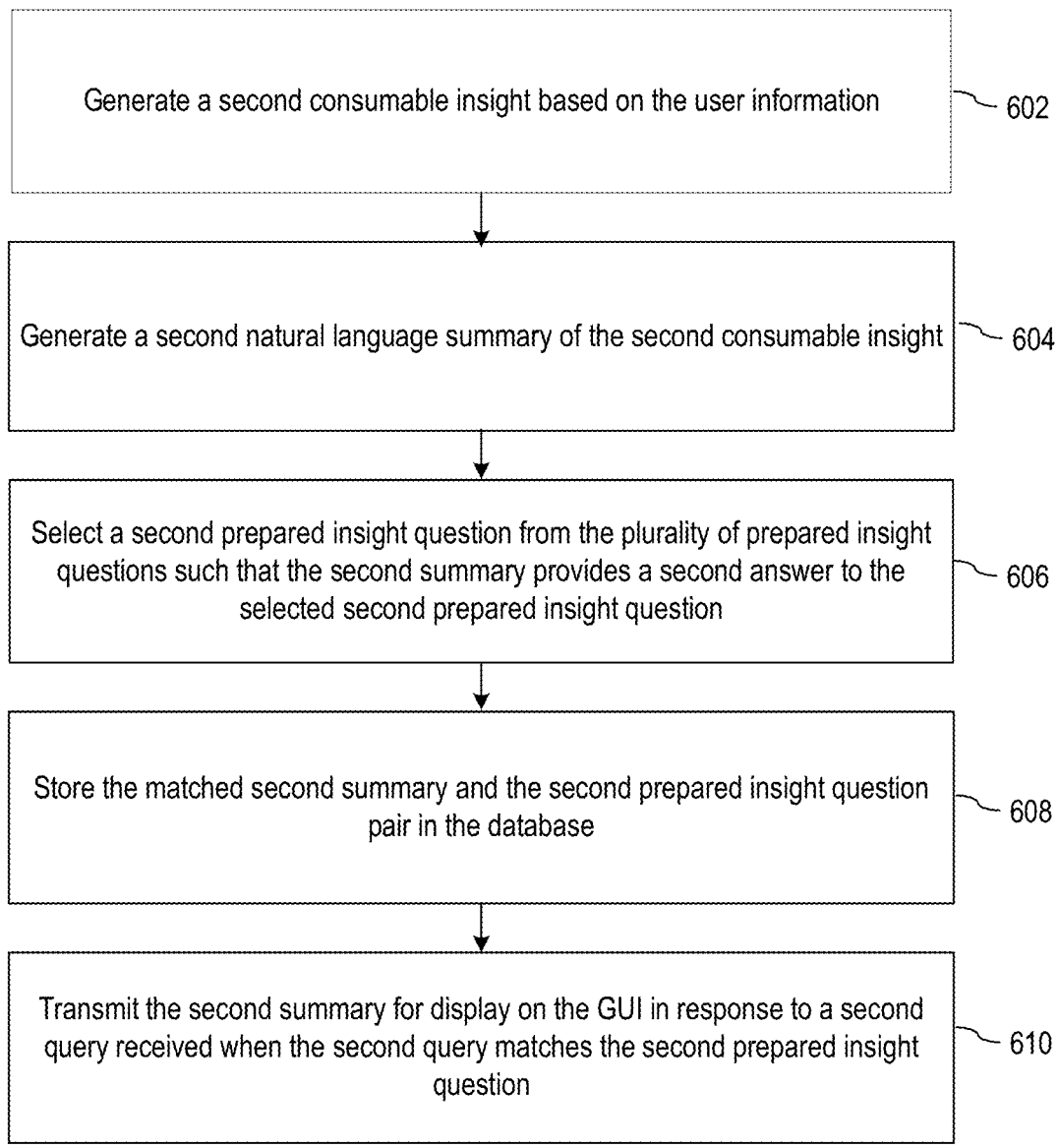
FIG. 6 is an example method of operating the system to generate a second consumable insight based on user information according to aspects.

FIG. 6 is an example method 600 of operating the system 100 to generate a second consumable insight based on user information according to aspects. Method 600 may be performed as a series of steps. At step 602, method 600 can include generating a second consumable insight based on a user information obtained based on identifying users from the log file 104. At step 604, a second natural language summary of the second consumable insight may be generated. At step 606, a second prepared insight question may be selected from a plurality of prepared insight questions such that the second natural language summary provides a second answer to the selected second prepared insight question. At step 608, the matched second natural language summary and the second prepared insight question pair may be stored in the database 128. At step 610, the second natural language summary may be transmitted for display on the GUI in response to a second query received when the second query matches the second prepared insight question.

Figure 7:
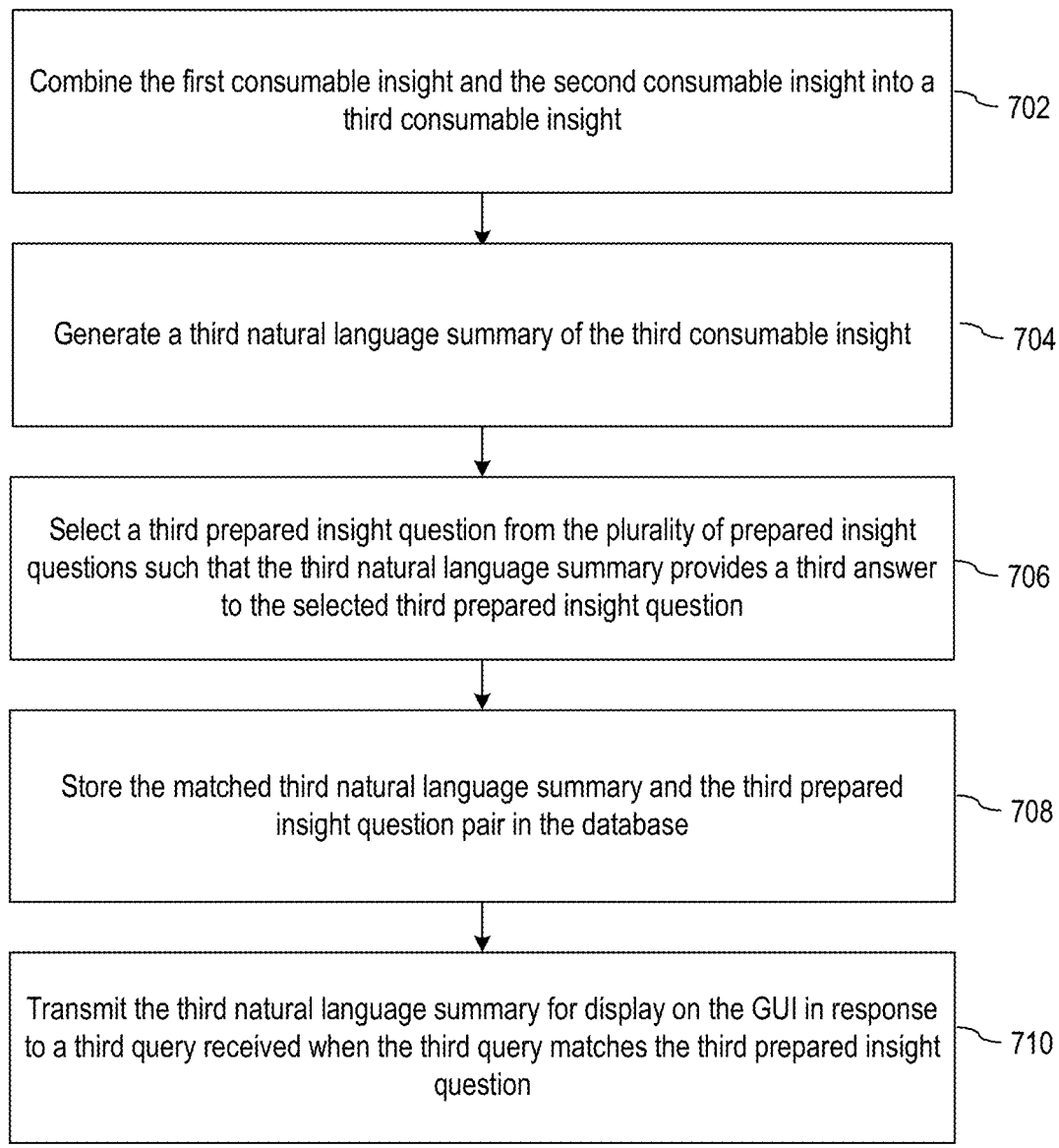
FIG. 7 is an example method of operating the system to combine a first consumable insight and the second consumable insight into a third consumable insight according to aspects.

FIG. 7 is an example method 700 of operating the system 100 to combine a first consumable insight and the second consumable insight into a third consumable insight according to aspects. Method 700 may be performed as a series of steps. At step 702, method 700 can include combining the first consumable insight and the second consumable insight into a third consumable insight. At step 704 a third natural language summary of the third consumable insight may be generated. At step 706, a third prepared insight question may be selected from a plurality of prepared insight questions such that the third natural language summary provides a third answer to the selected third prepared insight question. At step 708, the matched third natural language summary and the third prepared insight question pair may be stored in the database 128. At step 710, the third natural language summary may be transmitted for display on the GUI in response to a third query received when the third query matches the third prepared insight question.

The operations of methods 500, 600, and 700 are performed, for example, by system 100, in accordance with aspects described above.

Components of the System

Figure 8:
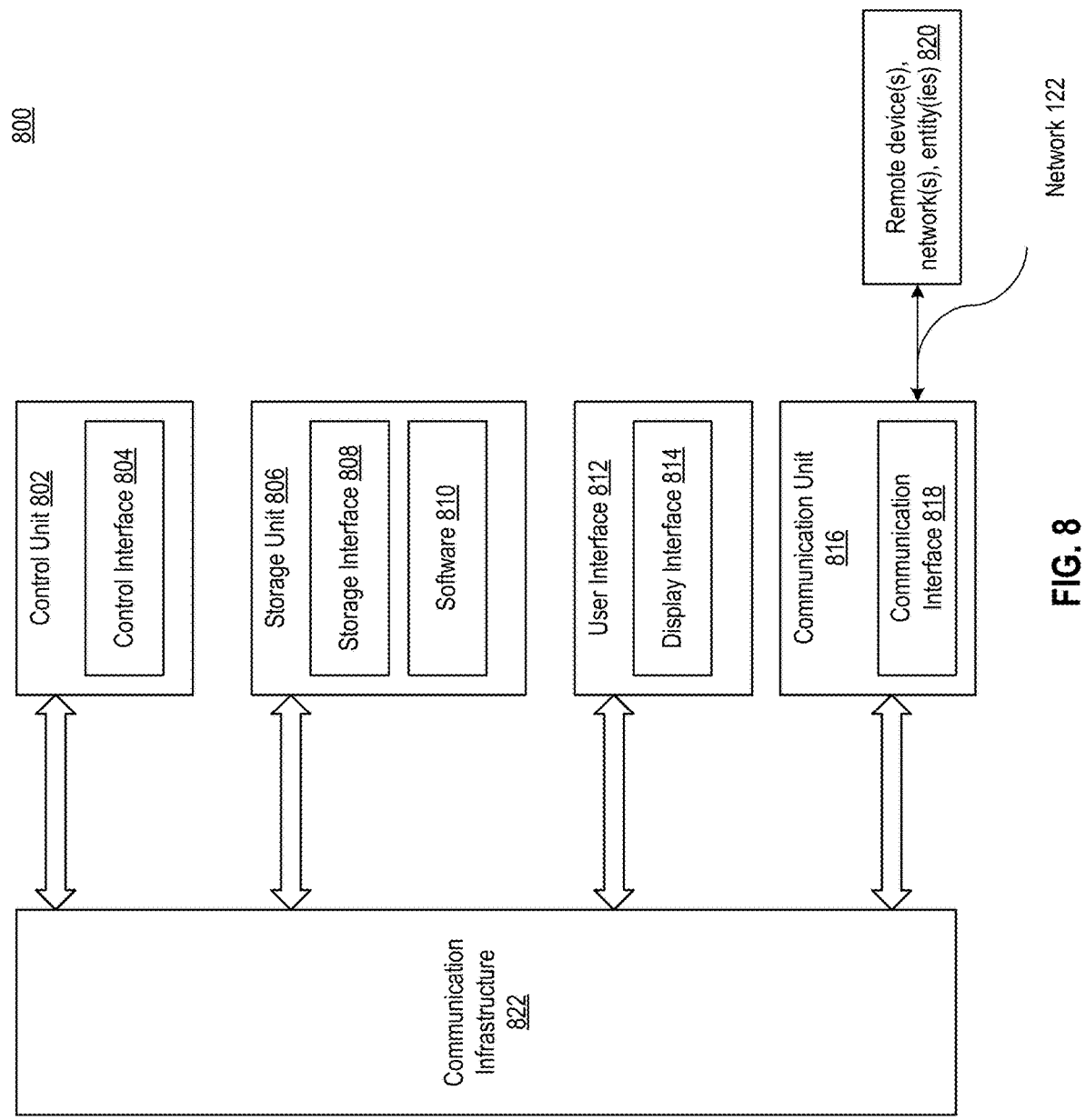
FIG. 8 is an example architecture of the components implementing the system according to aspects.

FIG. 8 is an example architecture 800 of the components implementing the system 100 according to aspects. The components may be the components of the server on which the system 100 is implemented, or may be components of the client device 120. In aspects, the components may include a control unit 802, a storage unit 806, a communication unit 816, and a user interface 812. The control unit 802 may include a control interface 804. The control unit 802 may execute a software 810 to provide some or all of the intelligence of system 100. The control unit 802 may be implemented in a number of different ways. For example, the control unit 802 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 804 may be used for communication between the control unit 802 and other functional units or devices of system 100. The control interface 804 may also be used for communication that is external to the functional units or devices of system 100. The control interface 804 may receive information from the functional units or devices of system 100, or from remote devices 820, such as the platform 102, the user profile database 132, or the client device 120, or may transmit information to the functional units or devices of system 100, or to remote devices 820. The remote devices 820 refer to units or devices external to system 100.

The control interface 804 may be implemented in different ways and may include different implementations depending on which functional units or devices of system 100 or remote devices 820 are being interfaced with the control unit 802. For example, the control interface 804 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 804 may be connected to a communication infrastructure 822, such as a bus, to interface with the functional units or devices of system 100 or remote devices 820.

The storage unit 806 may store the software 810. For illustrative purposes, the storage unit 806 is shown as a single element, although it is understood that the storage unit 806 may be a distribution of storage elements. Also for illustrative purposes, the storage unit 806 is shown as a single hierarchy storage system, although it is understood that the storage unit 806 may be in a different configuration. For example, the storage unit 806 may be formed with different storage technologies forming a memory hierarchical system including different levels of caching, main memory, rotating media, or off-line storage. The storage unit 806 may be a volatile memory, a nonvolatile memory, an internal memory, an external memory, or a combination thereof. For example, the storage unit 806 may be a nonvolatile storage such as nonvolatile random access memory (NVRAM), Flash memory, disk storage, or a volatile storage such as static random access memory (SRAM) or dynamic random access memory (DRAM).

The storage unit 806 may include a storage interface 808. The storage interface 808 may be used for communication between the storage unit 806 and other functional units or devices of system 100. The storage interface 808 may also be used for communication that is external to system 100. The storage interface 808 may receive information from the other functional units or devices of system 100 or from remote devices 820, or may transmit information to the other functional units or devices of system 100 or to remote devices 820. The storage interface 808 may include different implementations depending on which functional units or devices of system 100 or remote devices 820 are being interfaced with the storage unit 806. The storage interface 808 may be implemented with technologies and techniques similar to the implementation of the control interface 804.

The communication unit 816 may enable communication to devices, components, modules, or units of system 100 or to remote devices 820. For example, the communication unit 816 may permit the system 100 to communicate between the server on which the system 100 is implemented and the client device 120, the platform 102, etc. The communication unit 816 may further permit the devices of system 100 to communicate with remote devices 820 such as an attachment, a peripheral device, or a combination thereof through the network 122.

As previously indicated, the network 122 may span and represent a variety of networks and network topologies. For example, the network 122 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 122. Cable, Ethernet, digital subscriber line (DSL), fiber optic lines, fiber to the home (FTTH), and plain old telephone service (POTS) are examples of wired communication that may be included in the network 122. Further, the network 122 may traverse a number of network topologies and distances. For example, the network 122 may include direct connection, personal area network (PAN), local area network (LAN), metropolitan area network (MAN), wide area network (WAN), or a combination thereof.

The communication unit 816 may also function as a communication hub allowing system 100 to function as part of the network 122 and not be limited to be an end point or terminal unit to the network 122. The communication unit 816 may include active and passive components, such as microelectronics or an antenna, for interaction with the network 122.

The communication unit 816 may include a communication interface 818. The communication interface 818 may be used for communication between the communication unit 816 and other functional units or devices of system 100 or to remote devices 820. The communication interface 818 may receive information from the other functional units or devices of system 100, or from remote devices 820, or may transmit information to the other functional units or devices of the system 100 or to remote devices 820. The communication interface 818 may include different implementations depending on which functional units or devices are being interfaced with the communication unit 816. The communication interface 818 may be implemented with technologies and techniques similar to the implementation of the control interface 804.

The user interface 812 may present information generated by system 100. In aspects, the user interface 812 allows the users to interface with the system 100. The user interface 812 can present the product analytics dashboard 130 which users of the system 100 can interact with and present queries into the system 100 with. The user interface 812 may include an input device and an output device. Examples of the input device of the user interface 812 may include a keypad, buttons, switches, touchpads, soft-keys, a keyboard, a mouse, or any combination thereof to provide data and communication inputs. Examples of the output device may include a display interface 814. The control unit 802 may operate the user interface 812 to present information generated by system 100. The control unit 802 may also execute the software 810 to present information generated by system 100, or to control other functional units of system 100. The display interface 814 may be any graphical user interface such as a display, a projector, a video screen, or any combination thereof.

Product Analytics Dashboard

Figure 9:
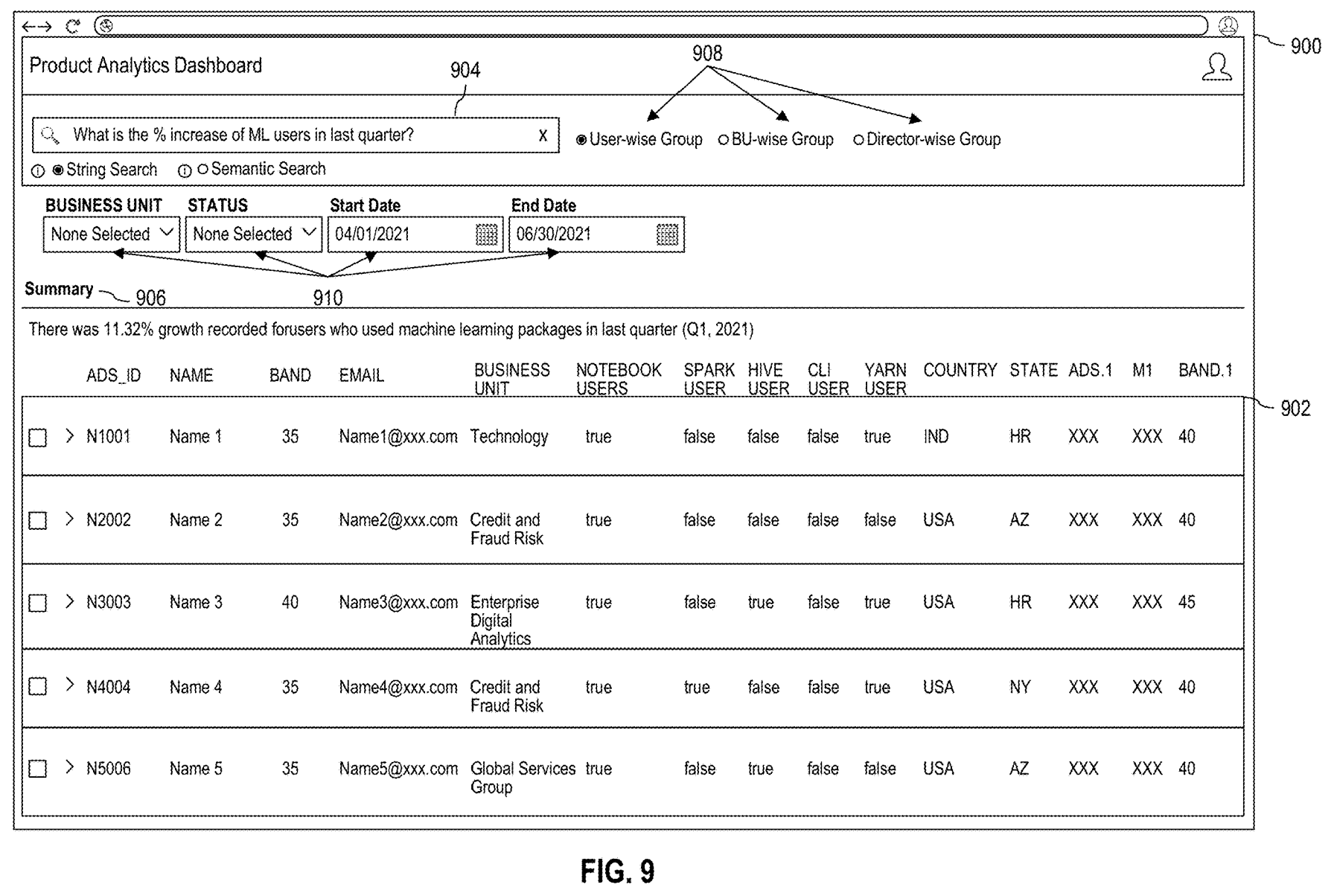
Figure 10:
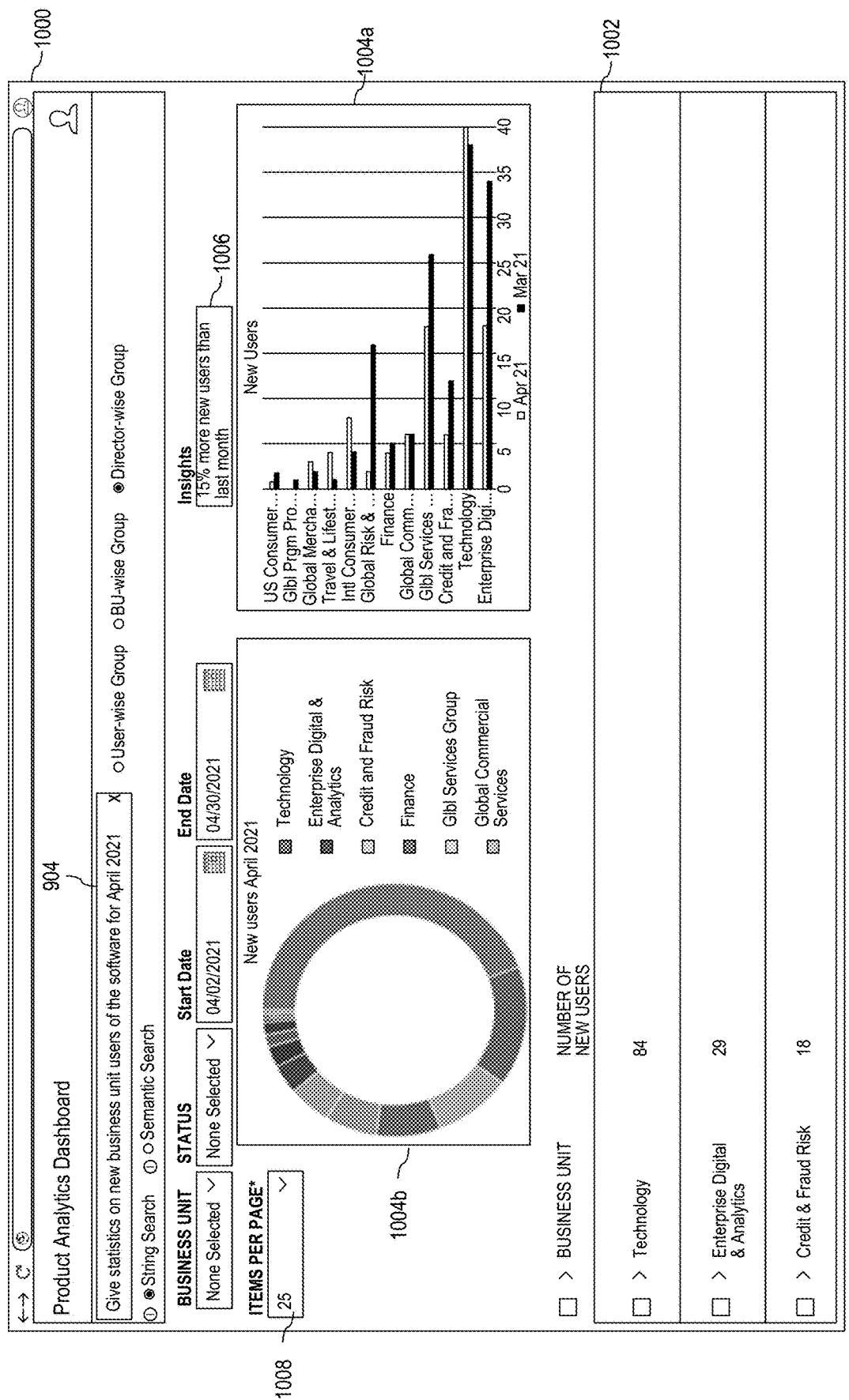
FIG. 10 shows an example GUI of the system showing a product analytics dashboard and a business unit-wise display according to aspects.

FIGS. 9-10 discuss the product analytics dashboard 130 of FIG. 1. FIG. 9 shows an example graphical user interface (GUI) 900 of the system 100 showing the product analytics dashboard 130 and a user-wise display 902 according to aspects. The user-wise display 902 refers to a display screen or frame of the product analytics dashboard 130 that displays consumable insights for users of the software. In aspects, the consumable insights displayed in the user-wise display 902 can include information about specific users who have used the software and can include further information regarding those users including the names of users, contact information for the users, the business unit the users belong to, information regarding what packages or package sub-modules and/or services used by those users, the geographic location of those users, etc. This information may be obtained based on the consumable insights generated by the insight generation modules 116 and/or the user profiles generated by the user roll up generation module 108.

In aspects, the product analytics dashboard 130 can have a search box 904. The search box 904 may be used by users of the system 100 to input queries into the system 100. The output given by the system 100 in response to the queries may be displayed in a summary section 906 of the product analytics dashboard 904. As shown in FIG. 9, an input query was put into the search box 904 asking, "What was the % increase of users using the machine learning packages last quarter?" In response, the system 100 can output in the summary section 906 an answer, for example, "There was 11.32% growth recorded for users who used machine learning packages in the last quarter (Q1, 2021)."

In aspects, the product analytics dashboard 130 can also include one or more radio buttons 908. The radio buttons 908 may be used to toggle between different display modes of the product analytics dashboard 130. These modes can include the user-wise display 902, a business unit-wise display 1002 (shown in FIG. 10), and a director-wise display 1102 (shown in FIG. 11). The business unit-wise 1002 display and the director-wise display 1102 will be discussed further below.

In aspects, the product analytics dashboard 130 can also include one or more drop down boxes 910 that may be used to filter the data shown in the user-wise display. The drop down boxes 910 may be used to modify dates, or filter by business units, etc. for any outputs generated by the system 100.

FIG. 10 shows an example GUI 1000 of the system 100 showing a product analytics dashboard 130 and a business unit-wise display 1002 according to aspects. In aspects, the business unit-wise display 1002 refers to a display screen or frame of the product analytics dashboard 130 that displays consumable insights focused on business units and the users within those business units that use the software. The consumable insights displayed in the business unit-wise display 1002 can include information about how business units are using the software, including information related to the number of users within business units using the software, new users within business units using the software, or any other consumable insights on a business unit level regarding usage of the software. This information may be obtained based on the consumable insights generated by the insight generation modules 116 and/or the user profiles generated by the user roll up generation module 108.

FIG. 10 shows a query being input into the search box 904 which asks "give statistics on business unit users of the software for April 2021. In response to the query, the system 100 can generate multiple outputs showing the consumable insights generated. In aspects, these can include a consumable insights in the forms of charts 1004a and 1004b showing the number of new users by business unit, in addition to a table showing the number of new users in the business unit-wise display 1002. Further consumable insights may be displayed in a box 1006 indicating a natural language summary of a consumable insight in response to the input query. The product analytics dashboard 130 can have a drop down icon 1008 that may be used to adjust the number of results displayed.

FIG. 11 shows an example GUI 1100 of the system 100 showing a product analytics dashboard 130 and a director-wise display 1102 according to aspects. The director-wise display 1102 refers to a display screen or frame of the product analytics dashboard 130 that displays consumable insights focused on specific directors or business unit leaders and the teams they lead. Thus, the director-wise display merges aspects of both the user-wise display 902 and the business unit-wise display 1002 to give consumable insights regarding individual users that are leaders of business units and their teams. The consumable insights displayed in the director-wise display 1102 can include information like director names that have used the software, the number of colleagues/direct reports of these directors, the packages and package sub-modules and/or services of the software they have used, the time spent using the software, etc. This information may be obtained based on the consumable insights generated by the insight generation modules 116 and/or the user profiles generated by the user roll up generation module 108.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in an aspect of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the aspects may be coupled to one another as described or as shown. The coupling may be direct or indirect, without or with intervening items between coupled modules, units, or services. The coupling may be by physical contact or by communication between modules, units, or services.

The above detailed description and aspects of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods 500, 600, and 700, and system 100 are cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the aspects of the present disclosure consequently further the state of the technology to at least the next level. While the disclosed aspects have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer implemented method for generating product analytics insights for machine learning platforms, the method comprising:
　categorizing, by one or more computing devices and using a natural language processing algorithm, software packages and package sub-modules of a software program into a plurality of package categories based on a received log file comprising data derived while executing the software program on a platform, wherein the natural language processing algorithm determines context for tokens extracted from keywords, and wherein the keywords are extracted from descriptions of the software packages and the package sub-modules of the software program;
　categorizing, by the one or more computing devices, a notebook storing the software program into a notebook category based on the categorized software packages and the categorized package sub-modules;
　generating, by the one or more computing devices, a consumable insight based on:
　　the categorized software packages and the categorized package sub-modules, and
　　the categorized notebook,
　　　wherein the consumable insight specifies a metric quantifying usage of the software program;
　generating, by the one or more computing devices and using a natural language generation algorithm, a summary in a natural language describing the consumable insight, wherein the natural language generation algorithm includes training a statistical model and a machine learning model, wherein the statistical model and the machine learning model are trained using a plurality of prepared insight questions;

selecting, by the one or more computing devices and using a matching machine learning model, a prepared insight question from the plurality of prepared insight questions such that the summary provides an answer, in the natural language, to the prepared insight question, wherein an input to the matching machine learning model is generated summaries in the natural language;

storing, by the one or more computing devices, a matched summary and prepared insight question pair in a database; and transmitting, by the one or more computing devices, the summary for display on a graphical user interface (GUI) in response a query received when the query matches the prepared insight question.

2. The method of claim 1, wherein the consumable insight is a first consumable insight, and further comprising:

generating, by the one or more computing devices, a second consumable insight based on a user information of authors and users of the software program determined from the received log file;

generating, by the one or more computing devices and in the natural language, a second summary of the second consumable insight;

selecting, by the one or more computing devices, a second prepared insight question from the plurality of prepared insight questions such that the second summary provides a second answer, in the natural language, to the second prepared insight question;

storing, by the one or more computing devices, a matched second summary and second prepared insight question pair in the database; and transmitting, by the one or more computing devices, the second summary for display on the GUI in response to a second query received when the second query matches the second prepared insight question.

3. The method of claim 2, further comprising:

combining, by the one or more computing devices, the first consumable insight and the second consumable insight into a third consumable insight;

generating, by the one or more computing devices and in the natural language, a third summary of the third consumable insight;

selecting, by the one or more computing devices, a third prepared insight question from the plurality of prepared insight questions such that the third summary provides a third answer, in the natural language, to the third prepared insight question;

storing, by the one or more computing devices, a matched third summary and third insight question pair in the database; and transmitting, by the one or more computing devices, the third summary for display on the GUI in response to a third query received when the third query matches the third prepared insight question.

4. The method of claim 1, further comprising pre-processing, by the one or more computing devices, the received log file to remove unwanted data.

5. The method of claim 2, further comprising generating, by the one or more computing devices, a user profile based on the user information determined from the received log file.

6. The method of claim 1, wherein the plurality of package categories comprise: a machine learning category, an analytics category, and a general purpose.

7. The method of claim 1, wherein notebook categories comprise: a machine learning category, an analytics category, a general purpose category, and a no code category.

8. A non-transitory computer readable medium including instructions for causing a processor to perform operations for generating product analytics insights for machine learning platforms, the operations comprising:

categorizing, by one or more computing devices and using a natural language processing algorithm, software packages and package sub-modules of a software program into a plurality of package categories based on a received log file comprising data derived while executing the software program on a platform, wherein the natural language processing algorithm determines context for tokens extracted from keywords, and wherein the keywords are extracted from descriptions of the software packages and the package sub-modules of the software program;

categorizing, by the one or more computing devices, a notebook storing the software program into a notebook category based on the categorized software packages and the categorized package sub-modules;

generating, by the one or more computing devices, a consumable insight based on:
    the categorized software packages and the categorized package sub-modules, and
    the categorized notebook,
        wherein the consumable insight specifies a metric quantifying usage of the software program;

generating, by the one or more computing devices and using a natural language generation algorithm, a summary in natural language describing the consumable insight, wherein the natural language generation algorithm includes training a statistical model and a machine learning model, wherein the statistical model and the machine learning model are trained using a plurality of prepared insight questions;

selecting, by the one or more computing devices and using a matching machine learning model, a prepared insight question from the plurality of prepared insight questions such that the summary provides an answer, in the natural language, to the prepared insight question, wherein an input to the matching machine learning model is generated summaries in the natural language;

storing, by the one or more computing devices, a matched summary and prepared insight question pair in a database; and transmitting, by the one or more computing devices, the summary for display on a graphical user interface (GUI) in response a query received when the query matches the prepared insight question.

9. The non-transitory computer readable medium of claim 8, wherein the consumable insight is a first consumable insight, and wherein the operations further comprise:

generating, by the one or more computing devices, a second consumable insight based on a user information of authors and users of the software program determined from the received log file;

generating, by the one or more computing devices and in the natural language, a second summary of the second consumable insight;

selecting, by the one or more computing devices, a second prepared insight question from the plurality of prepared insight questions such that the second summary provides a second answer, in the natural language, to the second prepared insight question;

storing, by the one or more computing devices, a matched second summary and second prepared insight question pair in the database; and transmitting, by the one or more computing devices, the second summary for display on the GUI in response to a second query received when the second query matches the second prepared insight question.

10. The non-transitory computer readable medium of claim 9, wherein the operations further comprise:

combining, by the one or more computing devices, the first consumable insight and the second consumable insight into a third consumable insight;

generating, by the one or more computing devices and in the natural language, a third summary of the third consumable insight;

selecting, by the one or more computing devices, a third prepared insight question from the plurality of prepared insight questions such that the third summary provides a third answer, in the natural language, to the third prepared insight question;

storing, by the one or more computing devices, a matched third summary and third insight question pair in the database; and transmitting, by the one or more computing devices, the third summary for display on the GUI in response to a third query received when the third query matches the third prepared insight question.

11. The non-transitory computer readable medium of claim 8, wherein the operations further comprise pre-processing, by the one or more computing devices, the received log file to remove unwanted data.

12. The non-transitory computer readable medium of claim 9, wherein the operations further comprise generating, by the one or more computing devices, a user profile based on the user information determined from the received log file.

13. The non-transitory computer readable medium of claim 8, wherein the plurality of package categories comprise: a machine learning category, an analytics category, and a general purpose.

14. The non-transitory computer readable medium of claim 8, wherein notebook categories comprise: a machine learning category, an analytics category, a general purpose category, and a no code category.

15. A computing system for generating product analytics insights for machine learning platforms comprising:

at least one processor configured to:

categorize, using a natural language processing algorithm, software packages and package sub-modules of a software program into a plurality of package categories based on a received log file comprising data derived while executing the software program on a platform, wherein the natural language processing algorithm determines context for tokens extracted from keywords, and wherein the keywords are extracted from descriptions of the software packages and the package sub-modules of the software program, categorize a notebook storing the software program into a notebook category based on the categorized software packages and the categorized package sub-modules, generate a consumable insight based on:
 the categorized software packages and the categorized package sub-modules, and
 the categorized notebook,
 wherein the consumable insight specifies a metric quantifying usage of the software program, generate, using a natural language generation algorithm, a summary in a natural language describing the consumable insight, wherein the natural language generation algorithm includes training a statistical model and a machine learning model, wherein the statistical model and the machine learning model are trained using a plurality of prepared insight questions, select, using a matching machine learning model, a prepared insight question from the plurality of prepared insight questions such that the summary provides an answer, in the natural language, to the prepared insight question, wherein an input to the matching machine learning model is generated summaries in natural language, and transmit the summary for display on a graphical user interface (GUI) in response to a query received when the query matches the prepared insight question; and a memory, coupled to the at least one processor, configured to store a matched summary and prepared insight question pair in a database.

16. The computing system of claim 15, wherein the consumable insight is a first consumable insight, and wherein:

the at least one processor is further configured to:

generate a second consumable insight based on a user information of authors and users of the software program determined from the received log file;

generate, in the natural language, a second summary of the second consumable insight;

select a second prepared insight question from the plurality of prepared insight questions such that the second summary provides a second answer, in the natural language, to the second prepared insight question; and transmit the second summary for display on the GUI in response to a second query received when the second query matches the second prepared insight question;

the memory is further configured to store a matched second summary and second prepared insight question pair in the database.

17. The computing system of claim 16, wherein:

the at least one processor is further configured to:

combine the first consumable insight and the second consumable insight into a third consumable insight, generate, in the natural language, a third summary of the third consumable insight;

select a third prepared insight question from the plurality of prepared insight questions such that the third summary provides a third answer, in the natural language, to the third prepared insight question; and transmit the third summary for display on the GUI in response to a third query received when the third query matches the third prepared insight question;

the memory is further configured to store a matched third summary and third prepared insight question pair in the database.

18. The computing system of claim 15, wherein the at least one processor is further configured to pre-process the received log file to remove unwanted data.

19. The computing system of claim 16, wherein the at least one processor is further configured to generate a user profile based on the user information determined from the received log file.

20. The computing system of claim 15, wherein:
the package categories comprise: a machine learning package category, an analytics package category, and a general purpose; and
the notebook categories comprise: a machine learning notebook category, an analytics notebook category, a general purpose category, and a no code category.

* * * * *